(12) United States Patent
Kurose

(10) Patent No.: US 8,094,968 B2
(45) Date of Patent: Jan. 10, 2012

(54) IMAGE CREATING METHOD AND IMAGE CREATING SYSTEM

(75) Inventor: Tsutomu Kurose, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 832 days.

(21) Appl. No.: 12/219,994

(22) Filed: Jul. 31, 2008

(65) Prior Publication Data

US 2009/0034873 A1    Feb. 5, 2009

(30) Foreign Application Priority Data

Aug. 3, 2007  (JP) ................. 2007-202942

(51) Int. Cl.
*G06K 9/36* (2006.01)
(52) U.S. Cl. ........ 382/276; 382/100; 358/1.9; 358/3.03; 358/3.13; 358/3.16
(58) Field of Classification Search .................. 382/276, 382/100; 358/1.9, 3.03, 3.13, 3.16
See application file for complete search history.

(56) References Cited

U.S. PATENT DOCUMENTS

| | | | | |
|---|---|---|---|---|
| 5,963,714 A * | 10/1999 | Bhattacharjya et al. | ....... | 358/1.9 |
| 6,563,957 B1 * | 5/2003 | Li et al. | ......... | 382/252 |
| 7,119,928 B2 * | 10/2006 | Harrington | ............ | 358/3.2 |
| 2006/0181737 A1 * | 8/2006 | Kakutani | ............ | 358/3.03 |
| 2007/0041053 A1 * | 2/2007 | Cooper et al. | ............ | 358/3.03 |

FOREIGN PATENT DOCUMENTS

| | | |
|---|---|---|
| JP | 2003-158633 | 5/2003 |
| JP | 2006-245674 A | 9/2006 |
| JP | 2006-333431 A | 12/2006 |

OTHER PUBLICATIONS

Official Action issued on Aug. 3, 2011, in the counterpart Japanese Application No. 2007-202942, two pages, in Japanese.

* cited by examiner

*Primary Examiner* — Stephen Koziol
(74) *Attorney, Agent, or Firm* — The Nath Law Group; Jerald L. Meyer; Derek Richmond

(57) ABSTRACT

For a halftone representation of a grayscale data of an original image of P tones, an output resolution, a screen ruling frequency, and a screen angle are based to set a basic array of L×L pixels, where L is an integer greater than 1, and a number N of tones reproducible by the basic array is compared with P to generate a dither array using the basic array as its sub-array, such that numbers are assigned to pixels of sub-arrays by a prescribed rule, in order between the sub-arrays, starting from prescribed ones of centered and centermost pixels of the sub-arrays.

15 Claims, 15 Drawing Sheets

FIG. 4A

| 6 | 2 | 7 |
|---|---|---|
| 5 | 1 | 3 |
| 9 | 4 | 8 |

| 153 | 51 | 178 |
|---|---|---|
| 127 | 25 | 76 |
| 229 | 102 | 204 |

FIG. 5

| GRAYSCALE INTERVALS | 0-24 | 25-50 | 51-75 | 76-101 | 102-126 |
|---|---|---|---|---|---|
| DISTRIBUTION PATTERNS | | | | | |

| GRAYSCALE INTERVALS | 127-152 | 153-177 | 178-203 | 204-228 | 229-255 |
|---|---|---|---|---|---|
| DISTRIBUTION PATTERNS | | | | | |

| 36 | 25 | 17 | 21 | 29 | 33 |
|----|----|----|----|----|----|
| 32 | 13 | 5  | 9  | 14 | 26 |
| 24 | 12 | 1  | 2  | 6  | 18 |
| 20 | 8  | 4  | 3  | 10 | 22 |
| 28 | 16 | 11 | 7  | 15 | 30 |
| 35 | 31 | 23 | 19 | 27 | 34 |

| 248 | 172 | 117 | 144 | 199 | 227 |
|-----|-----|-----|-----|-----|-----|
| 220 | 89  | 34  | 62  | 96  | 179 |
| 165 | 82  | 6   | 13  | 41  | 124 |
| 137 | 55  | 27  | 20  | 68  | 151 |
| 192 | 110 | 75  | 48  | 103 | 206 |
| 241 | 213 | 158 | 130 | 186 | 234 |

| 21 | 5 | 25 | 22 | 6 | 26 |
|----|---|----|----|---|----|
| 17 | 1 | 9 | 18 | 2 | 10 |
| 33 | 13 | 29 | 34 | 14 | 30 |
| 23 | 7 | 27 | 24 | 8 | 28 |
| 19 | 3 | 11 | 20 | 4 | 12 |
| 35 | 15 | 31 | 36 | 16 | 32 |

| 144 | 34 | 172 | 151 | 41 | 179 |
|-----|----|----|----|----|----|
| 117 | 6 | 62 | 124 | 13 | 68 |
| 227 | 89 | 199 | 234 | 96 | 206 |
| 158 | 48 | 186 | 165 | 55 | 192 |
| 130 | 20 | 75 | 137 | 27 | 82 |
| 241 | 103 | 213 | 248 | 110 | 220 |

FIG. 9A

| 123 | 113 | 93 | 57 | 65 | 99 | 107 | 125 | 124 | 114 | 94 | 58 | 66 | 100 | 108 | 126 |
|---|---|---|---|---|---|---|---|---|---|---|---|---|---|---|---|
| 105 | 49 | 35 | 19 | 27 | 43 | 79 | 115 | 106 | 50 | 36 | 20 | 28 | 44 | 80 | 116 |
| 73 | 33 | 17 | 9 | 13 | 37 | 67 | 95 | 74 | 34 | 18 | 10 | 14 | 38 | 68 | 96 |
| 55 | 25 | 11 | 1 | 5 | 21 | 51 | 83 | 56 | 26 | 12 | 2 | 6 | 22 | 52 | 84 |
| 63 | 41 | 15 | 7 | 3 | 29 | 59 | 89 | 64 | 42 | 16 | 8 | 4 | 30 | 60 | 90 |
| 87 | 47 | 31 | 23 | 39 | 45 | 75 | 101 | 88 | 48 | 32 | 24 | 40 | 46 | 76 | 102 |
| 111 | 77 | 71 | 53 | 61 | 69 | 81 | 119 | 112 | 78 | 72 | 54 | 62 | 70 | 82 | 120 |
| 121 | 103 | 97 | 85 | 91 | 109 | 117 | 127 | 122 | 104 | 98 | 86 | 92 | 110 | 118 | 128 |
| 124 | 114 | 94 | 58 | 66 | 100 | 108 | 126 | 123 | 113 | 93 | 57 | 65 | 99 | 107 | 125 |
| 106 | 50 | 36 | 20 | 28 | 44 | 80 | 116 | 105 | 49 | 35 | 19 | 27 | 43 | 79 | 115 |
| 74 | 34 | 18 | 10 | 14 | 38 | 68 | 96 | 73 | 33 | 17 | 9 | 13 | 37 | 67 | 95 |
| 56 | 26 | 12 | 2 | 6 | 22 | 52 | 84 | 55 | 25 | 11 | 1 | 5 | 21 | 51 | 83 |
| 64 | 42 | 16 | 8 | 4 | 30 | 60 | 90 | 63 | 41 | 15 | 7 | 3 | 29 | 59 | 89 |
| 88 | 48 | 32 | 24 | 40 | 46 | 76 | 102 | 87 | 47 | 31 | 23 | 39 | 45 | 75 | 101 |
| 112 | 78 | 72 | 54 | 62 | 70 | 82 | 120 | 111 | 77 | 71 | 53 | 61 | 69 | 81 | 119 |
| 122 | 104 | 98 | 86 | 92 | 110 | 118 | 128 | 121 | 103 | 97 | 85 | 91 | 109 | 117 | 127 |

FIG. 9B

| | | | | | | | | | | | | | | | |
|---|---|---|---|---|---|---|---|---|---|---|---|---|---|---|---|
| | | | | | | | | | | | | | | | |
| | | | 17 | 25 | | | | | | | 18 | | | | |
| | | 21 | 1 | 9 | | | | | | 22 | 2 | 10 | | | |
| | | | 13 | 5 | | | | | | | 14 | 6 | | | |
| | | | | | | | | | | | | | | | |
| 253 | | | | | | | | 254 | | | | | | | |
| | | | | | | | | | | | | | | | |
| | | | | | | | | | | | | | | | |
| | | | 19 | | | | | | | | 20 | | | | |
| | | 23 | 3 | 11 | | | | | | 24 | 4 | 12 | | | |
| | | | 15 | 7 | | | | | | | 16 | 8 | | | |
| | | | | | | | | | | | | | | | |
| | | | | | | | | | | | | | | | |
| 255 | | | | | | | 256 | | | | | | | | |

IMAGE CREATING METHOD AND IMAGE CREATING SYSTEM

BACKGROUND OF THE INVENTION

1. Field of the Invention

The present invention relates to an image creating method and an image creating system.

2. Description of the Related Art

In Japanese Patent Application Laying-Open Publication No. 2003-158633, there is disclosed a technique for image creation using a dithering method to halftone a set of grayscale or multi-tone data of an original image frame.

The dithering method will be briefly described with reference to FIGS. 4 to 7.

Now assumed is a set of original image data (i.e., a set of data on pixels in an original image frame) all being a data of 8 bits, i.e., 256 tones from "0 (white)" to "255 (black)".

Given in FIG. 4 are diagrams of exemplary dither arrays of a halftone cell in a digital halftone processing for an output under conditions: resolution 300 dpi, screen ruling frequency 100 lpi, and screen angle 0 deg. Generally, the "number of reproducible different tones" can be represented such that (output resolution/ruling frequency)$^2$+1. Now, $(300/100)^2$+1=10 is the reproducible tone number, so the dither arrays have a size of 10−1=9=3×3 grid sections. Such sections one-to-one correspond to pixels (duotone dots) in the halftone cell, and will be referred herein simply to "pixels". FIG. 4A gives an exemplary tone distribution in which ranks "1" to "9" of reproducible tones are distributed to 3×3 arrayed pixels for each cell, in an order starting from a central pixel (emphasis added in the figure). For a halftone representation of 256 tones of image data, actually employed is a dither array of thresholds that correspond, as in FIG. 4B, to the tone ranks in the array of FIG. 4A, as they are multiplied by "255"/(3×3+1)="25.5" and rounded.

In the original image frame, each pixel has a tone within a range of levels "0" to "255", and pixels residing in a local image region corresponding to a halftone cell have a concentration commensurate with an average of their tones, i.e., a grayscale value. On the other hand, in the halftone cell, each pixel has simply a tone of either level "1" or "0" corresponding to a black dot or a white dot (as a dot-less white base), respectively, and does not have any intermediate tone in between. Instead, as illustrated in FIG. 5 for 3×3 dither arrays, the halftone cell provides a grayscale illusion within a grayscale interval depending on the pattern of distribution of thresholds, or proportion of areas of black dots.

FIG. 6 illustrates an exemplary process using 3×3 dither arrays to dither an original gray solid image frame of a grayscale value "80". This example reads a set of data on 3×3 pixels in a current local region of the original image frame, and compares the grayscale value of this region with grayscale intervals of 3×3 dither arrays in FIG. 5, to determine or identify a dither array of a corresponding threshold distribution pattern to be employed to output a cell of halftone image of a corresponding grayscale value. In this halftone cell, each pixel for which the dither array has set a threshold equivalent to or smaller than the grayscale value constitutes a black dot, and the remaining pixels appear as white dots. After that, a set of data on 3×3 pixels in a subsequent local region is read, and likewise processed. This corresponds to shifting a dither array from the current region to the subsequent region. Like this, an entire region of the original image frame is scanned, and halftone processed.

In such the dithering method, the grayscale intervals in halftone can be refined by changing the dither array to an expanded size, e.g. from 3×3 arrays in FIGS. 4A and 4B to 6×6 arrays in FIGS. 7A and 7B, so far as the reproducible tone number permits. For example, the 6×6 arrays permit the scale of 256 tones in original image to be parted into $6^2$+1=37 intervals by halftone, allowing for a refined grayscale representation in comparison with the 3×3 arrays.

SUMMARY OF THE INVENTION

However, such a simple expansion of dither array involves an issue, as follows:

FIG. 10 illustrates a result of a halftone process in which the 3×3 dither array of FIG. 4B (10 tones, center-to-enter distance: 3 pixels) was applied to a set of connected gray solid regions of an original image frame having a grayscale value "80". FIG. 11 illustrates a result of a halftone process in which the 6×6 dither array of FIG. 7B (37 tones, center-to-center distance: 6 pixels) was applied to the same region set.

When compared with 3×3 dither arrays before and after a shift, 6×6 dither arrays before and after a shift have an increased center-to-center distance between those pixels to which their minimum thresholds are allotted. The center-to-center distance between such pixels of dither arrays is reflected on a center-to-center distance between corresponding black dots of neighboring halftone cells. As a result, in comparison with FIG. 10, FIG. 11 provides a halftone image with a reduced reproducibility of an inherent original image.

The present invention has been devised in view of such points. It therefore is an object of the present invention to provide an image creating method and an image creating system, allowing for a refined grayscale interval in halftone with a suppressed variation in distance between pixels of minimal thresholds in dither arrays.

According to an aspect of the present invention, for creating a halftone image of an original image of a tone number P, where P is a given integer, an image creating method comprises the steps of: acquiring an output condition of the halftone image; generating a basic array of pixels meeting the output condition, the basic array consisting of (N−1) pixels, where N is an integer not exceeding a reproducible tone number under the output condition, letting the basic array be a sub-array, setting a super-array of Q sub-arrays, where Q is an integer, such that (N−1)Q≦P; setting a set of (N−1)R thresholds parting P tones, where R is an integer not exceeding Q; distributing the set of (N−1)R thresholds to pixels of R sub-arrays of the super-array, allotting lowest and near-lowest thresholds to central pixels of the R sub-arrays, to generate a dither array of thresholds parting P tones; and dithering a grayscale data of the original image by the dither array.

According to the above aspect of the present invention, a halftone image creating method has lowest and near-lowest thresholds allotted to central pixels of sub-arrays of a dither array, thus allowing for a refined grayscale interval in halftone with a suppressed variation in distance between pixels of minimal thresholds in dither arrays.

According to another aspect of the present invention, for creating a halftone image of an original image of a tone number P, where P is a given integer, an image creating system comprises: an output condition acquirer configured to acquire an output condition of the halftone image; a basic array generator configured to generate a basic array of pixels meeting the output condition, the basic array consisting of (N−1) pixels, where N is an integer not exceeding a reproducible tone number under the output condition: a dither array generator configured, letting the basic array be a sub-array, to set a super-array of Q sub-arrays, where Q is an integer, such that (N−1)Q≦P, set a set of (N−1)R thresholds parting P tones, where R is an integer not exceeding Q, and distribute the set of (N−1)R thresholds to pixels of R sub-arrays of the super-array, allotting lowest and near-lowest thresholds to central pixels of the R sub-arrays, to generate a dither array of thresholds parting P tones; and a data processor configured to dither a grayscale data of the original image by the dither array.

According to the above aspect of the present invention, a halftone image creating system has lowest and near-lowest thresholds allotted to central pixels of sub-arrays of a dither array, thus allowing for a refined grayscale interval in halftone with a suppressed variation in distance between pixels of minimal thresholds in dither arrays.

According to another aspect of the present invention, in the above-mentioned image creating method, the output condition may include an output resolution, a screen ruling frequency, and a screen angle, the basic array may be set as an array of L×L pixels, where L is an integer greater than 1, such that $N-1=L^2$, and the dither array may be generated by comparing N with P to determine one of:

(a) R=Q, to have numbers assigned to pixels of the Q sub-arrays by a prescribed rule, in order, starting from centered or centermost pixels of the Q sub-arrays, and substituted by thresholds corresponding thereto; and (b) R<Q, to have numbers assigned to pixels of the Q sub-arrays by a prescribed rule, alternately between the R sub-arrays and Q−R sub-arrays, in order, starting from centered or centermost pixels of the Q sub-arrays, and substituted by thresholds corresponding thereto.

According to another aspect of the present invention, in the above-mentioned image creating method, the output condition may include an output resolution, a screen ruling frequency, and a screen angle, the basic array may be set as an array of L×L pixels, where L is an integer greater than 1, such that $N-1=L^2$, and the dither array may be generated by determining:

(a) R=Q=2×2 for N not exceeding one fourth of P, to have numbers assigned to pixels of the Q sub-arrays by a prescribed rule, alternately between sub-arrays, in order, staring from centered or centermost pixels of the Q sub-arrays, and substituted by thresholds corresponding thereto;

(b) R=2 and Q=2×2 for N exceeding one fourth of P but not exceeding one half of P, to have numbers assigned to pixels of the Q sub-arrays by a prescribed rule, alternately with common numbers to the R sub-arrays to be diagonally arranged, and common numbers to Q−R sub-arrays, in order, starting from centered or centermost pixels of the Q sub-arrays, and substituted by thresholds corresponding thereto; and (c) R=Q=1 for N exceeding one half of P, to have numbers assigned to pixels of a Q sub-array by a prescribed rule, in order, starting from a centered or centermost pixel of the Q sub-array, and substituted by thresholds corresponding thereto.

According to another aspect of the present invention, in the above-mentioned image creating system, the output condition may include an output resolution, a screen ruling frequency, and a screen angle, the basic array may be set as an array of L×L pixels, where L is an integer greater than 1, such that $N-1=L^2$, and the dither array generator may compare N with P to determine one of:

(a) R=Q, to have numbers assigned to pixels of the Q sub-arrays by a prescribed rule, in order, starting from centered or centermost pixels of the Q sub-arrays, and substituted by thresholds corresponding thereto; and (b) R<Q, to have numbers assigned to pixels of the Q sub-arrays by a prescribed rule, alternately between the R sub-arrays and Q−R sub-arrays, in order, starting from centered or centermost pixels of the Q sub-arrays, and substituted by thresholds corresponding thereto.

According to another aspect of the present invention, in the above-mentioned image creating system, the output condition may include an output resolution, a screen ruling frequency, and a screen angle, the basic array may be set as an array of L×L pixels, where L is an integer greater than 1, such that $N-1=L^2$, and the dither array generator may determine one of:

(a) R=Q=2×2 for N not exceeding one fourth of P, to have numbers assigned to pixels of the Q sub-arrays by a prescribed rule, alternately between sub-arrays, in order, staring from centered or centermost pixels of the Q sub-arrays, and substituted by thresholds corresponding thereto;

(b) R=2 and Q=2×2 for N exceeding one fourth of P but not exceeding one half of P, to have numbers assigned to pixels of the Q sub-arrays by a prescribed rule, alternately with common numbers to the R sub-arrays to be diagonally arranged, and common numbers to Q−R sub-arrays, in order, starting from centered or centermost pixels of the Q sub-arrays, and substituted by thresholds corresponding thereto; and (c) R=Q=1 for N exceeding one half of P, to have numbers assigned to pixels of a Q sub-array by a prescribed rule, in order, starting from a centered or centermost pixel of the Q sub-array, and substituted by thresholds corresponding thereto.

BRIEF DESCRIPTION OF THE DRAWINGS

Given in FIG. 4 are exemplary dither arrays for a seen angle of 0 degree, wherein: FIG. 4A is a diagram of a dither array of ranks of 9 tones distributed to the whole pixels; and FIG. 4B, a diagram of a dither array of 256-tone parting thresholds distributed to the whole pixels.

FIG. 5 is a set of tables listing whole area-tone patterns of halftone cells in use of the dither array of FIG. 4B.

Given in FIG. 7 are dither arrays each having a 3×3 basic array of pixels row-wise and column-wise doubled in size, wherein.

Given in FIG. 8 are 2×2 dither arrays each having a 3×3 basic array of pixels as its sub-array, wherein.

Given in FIG. 9 are additional examples of dither array for the screen angle of 0 degree, in forms of 2×2 dither arrays each having a 6×6 basic array of pixels as its sub-array, wherein: FIG. 9A is a diagram of a dither array of ranks of 128 tones recurrently distributed to the whole pixels, in a manner of going rounds of respective basic arrays, allotting common ranks to pixels of diagonally arranged two basic arrays, and common subsequent ranks to pixels of the remaining two basic arrays, in order, starting from a round of prescribed ones of centermost pixels of the basic arrays; and FIG. 9B, a diagram of a (partly omitted) dither array of ranks of 256 tones distributed to the whole pixels, in a manner of going rounds of respective basic arrays, in order, starting from a round of prescribed ones of centermost pixels of the basic arrays.

Given in FIG. 19 are dither arrays using the array illustrated in FIG. 18, wherein.

Given in FIG. 22 are dither arrays using the array illustrated in FIG. 21, wherein.

DETAILED DESCRIPTION OF THE PREFERRED EMBODIMENTS

There will de described the preferred embodiments of the present invention, with reference to the accompanying drawings.

Figure 1:
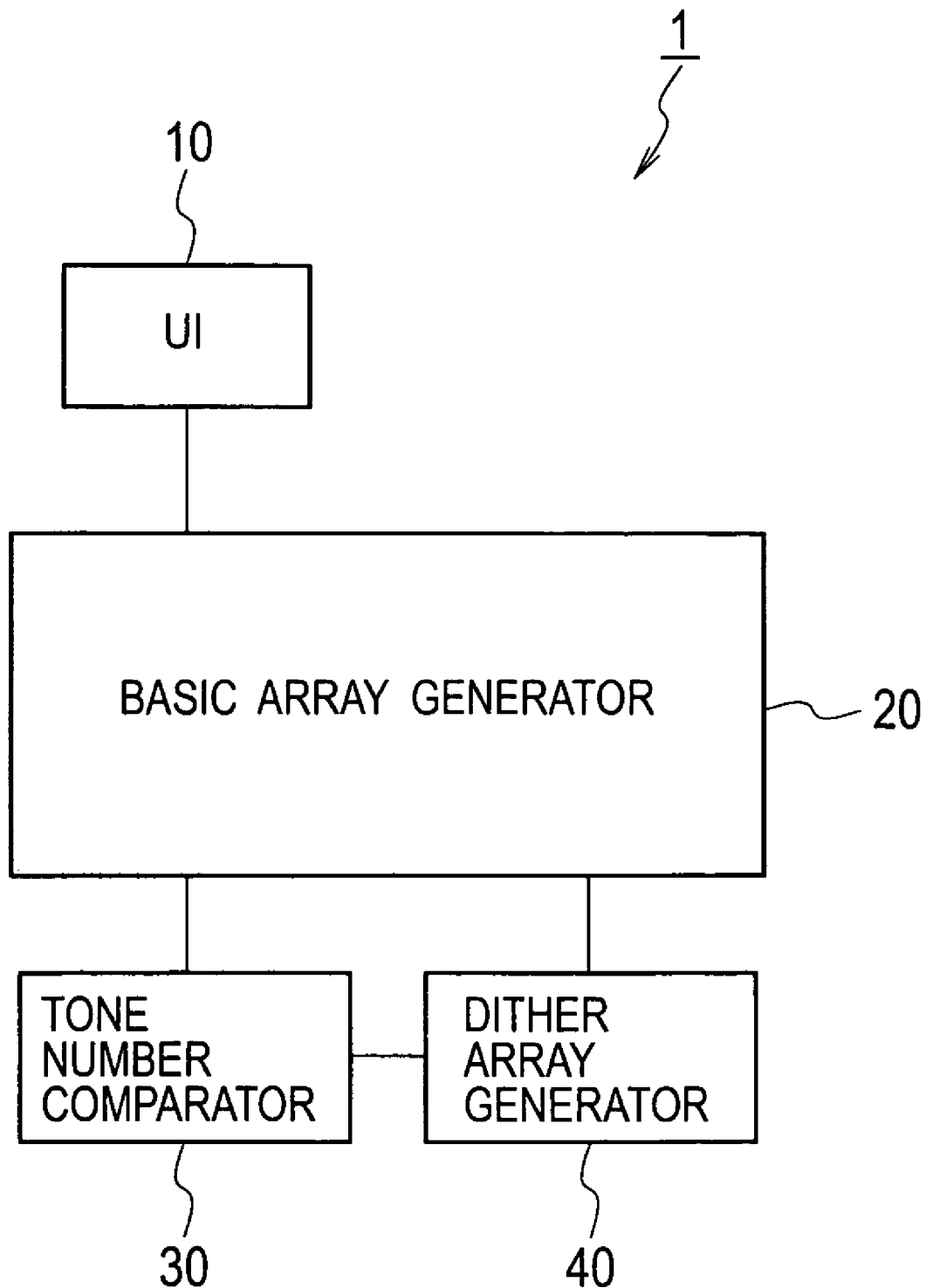
FIG. 1 is a schematic block diagram of an image creating system according to an embodiment of the present invention.

FIG. 1 is a schematic block diagram of an image creating system according to an embodiment of the present invention. The image creating system 1 includes a UI (user interface) 10, a basic array generator 20, and a dither array generator 40 provided with a tone number comparator 30.

Figure 2:
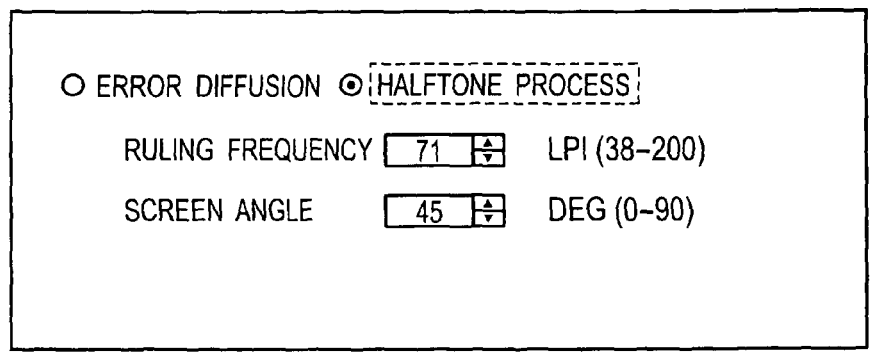
FIG. 2 is a schematic view of an exemplary user interface of the image creating system of FIG. 1.

As shown in FIG. 2, the UI 10 is configured to input a screen ruling frequency (as a ruling frequency to be within a range of 38 to 200 lpi) and a screen angle (as an angle to be within a range of 0 to 90 degrees). The UI 10 is operable by the user to input an arbitrary ruling frequency and an arbitrary screen angle, so that the system 1 can acquire the ruling frequency and screen angle. Description will be made simply for screen angles of 0 and 45 degrees.

The basic array generator (as hardware or software) 20 is configured for automatic generation of an adequate array (referred herein to "basic array") in a driver in accordance with an output resolution, ruling frequency, and screen angle.

The tone number comparator (as hardware or software) 30 is configured for comparison between a number of tones reproducible by the basic array, as an L×L array of pixels set up in accordance with acquired ruling frequency and screen angle, where L is an integer greater than 1, and a tone number of a grayscale data of a current region of an original image frame.

The dither array generator (as hardware or software) 40 is configured to depend on a result of comparison by the tone number comparator 30, to: set a super-array having the basic array as its sub-array; and generate a dither array by having numbers (ranks of N or more tones, in this embodiment) assigned to whole pixels of sub-arrays in the super-array by a prescribed rule, in order between the sub-arrays, starting from centered or centermost pixels of the sub-arrays, and each substituted by a corresponding one of N−1 or more thresholds parting P tones into N or more intervals.

In other words, if the reproducible tone number N of the basic array is equivalent to or smaller than one mm-th of the tone number P of original image data, i.e., N≦(1/mn)P, then the dither array generator 40 woks to: set up an m×n super-array having the basic arrays as its sub-array, where m and n are integers greater than 1 (a specific example will be described later); and have numbers assigned to whole pixels of sub-arrays in the super-array by a prescribed rule, in order between the sub-arrays, starting from centered or centermost pixels of the sub-arrays, and substituted by thresholds corresponding thereto, thereby generating a dither array consisting of (L×m)×(L×n) pixels.

Further, if the reproducible tone number N of the basic array is greater than one mm-th of the tone number P of original image data, but not exceeding one half of P, i.e., (1/mn) P<N≦(½)P, then the dither array generator 40 woks to: set up a 2×2 super-array having the basic arrays as its sub-array, where m and n are integers greater than 1 (a specific example will be described later); and have numbers assigned to whole pixels of sub-arrays in the super-array by a prescribed rule, alternately allotting common numbers to diagonally arranged sub-arrays, and common numbers to the remaining two sub-arrays, in order, starting from prescribed ones of centered or centermost pixels of the sub-arrays, and substituted by thresholds corresponding thereto, thereby generating a dither array consisting of 2L×2L pixels.

Further, if the reproducible tone number N of the basic array is greater than one half of the tone number P of original image data, i.e., (½)P<N, then the dither array generator 40 woks to have numbers assigned to whole pixels of a single sub-array (i.e. the basic array) by a prescribed rule, in order, starting from prescribed ones of centered or centermost pixels of the sub-array, and substituted by thresholds corresponding thereto, thereby generating a dither array consisting of L×L pixels.

The above-noted prescribed rules for assigning numbers to pixels may include one or more of methods of arranging numbers in a curl or eddy form, arranging numbers in a pyramid form, arranging numbers in a cone form, etc.

Figure 3:
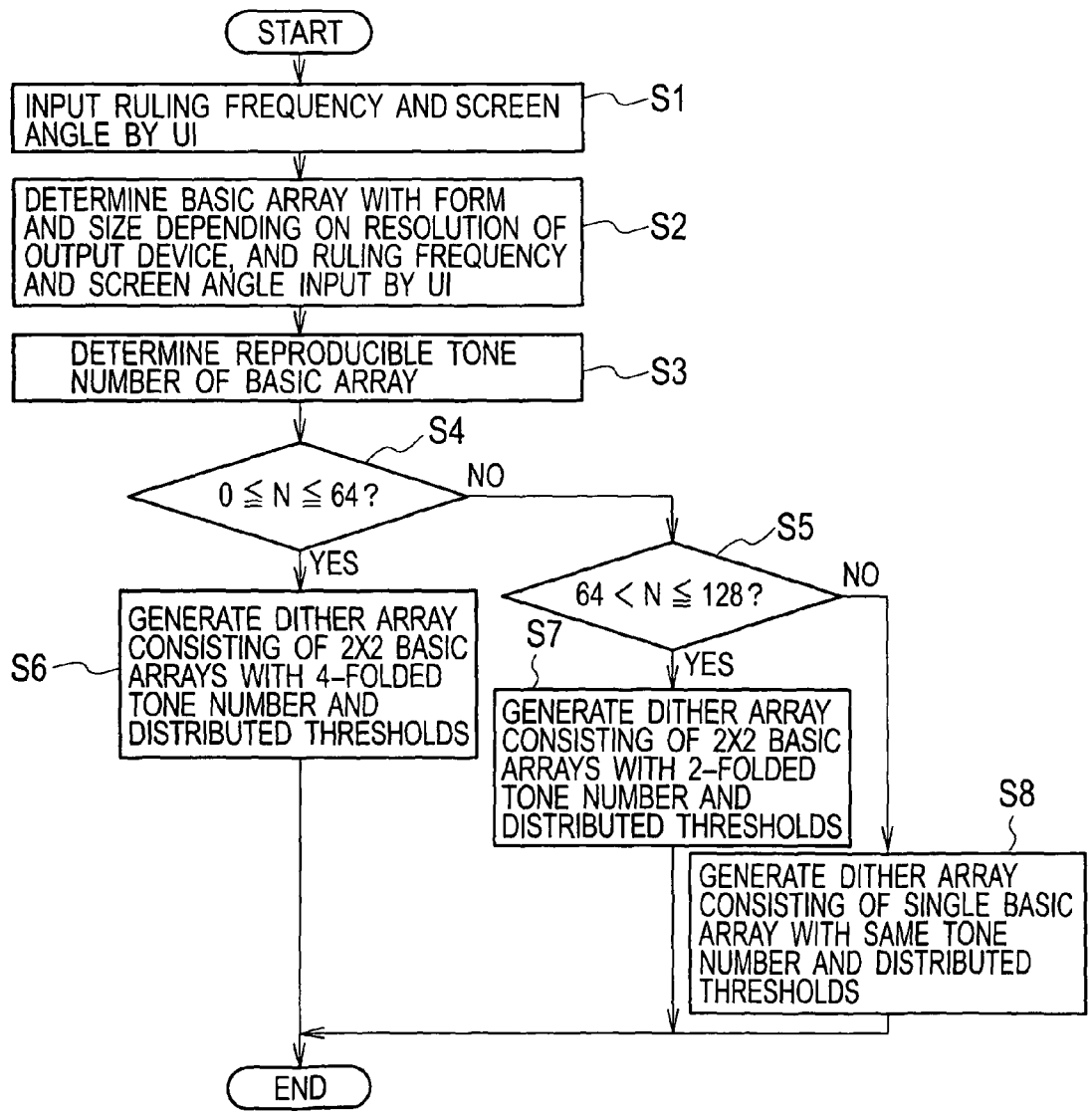
FIG. 3 is a flowchart of actions of the image creating system of FIG. 1 implementing an image creating method according to an embodiment of the present invention.
Figure 6:
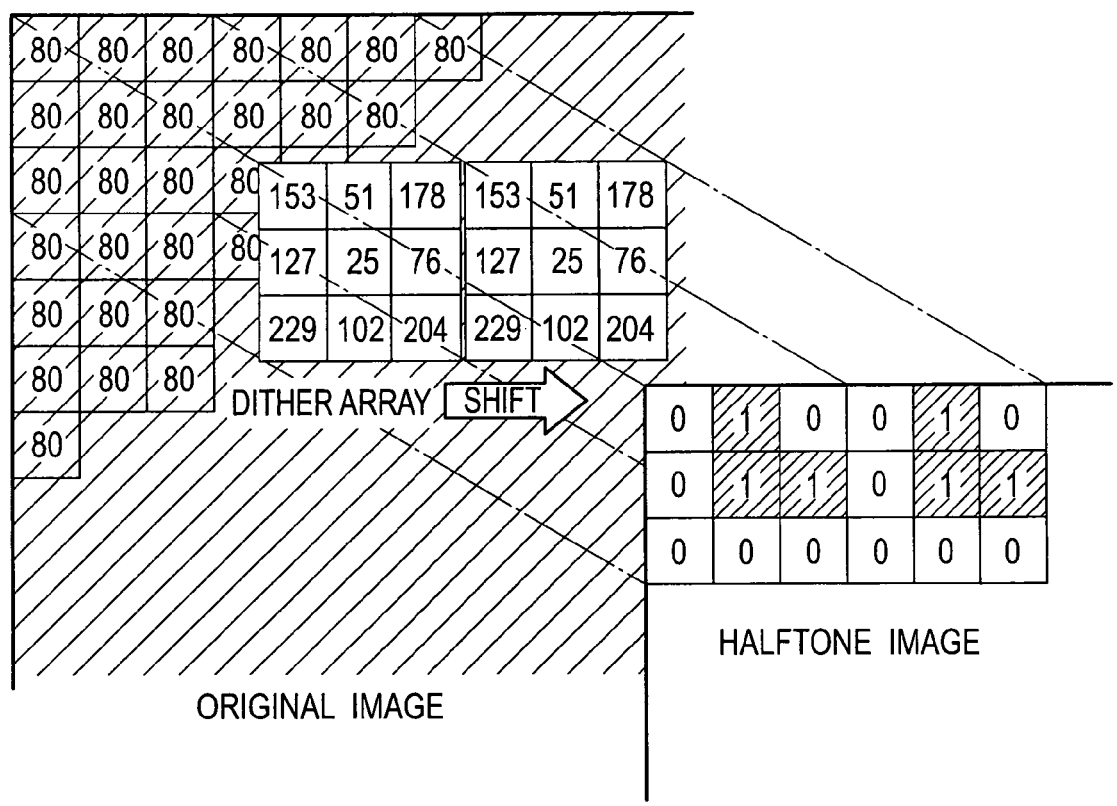
FIG. 6 is an illustration of a dithering.

FIG. 3 is a flowchart of actions of the image creating system of FIG. 1 implementing an image creating method according to an embodiment of the present invention. This image creating method includes: a process (as a step S1) of inputting a ruling frequency and a screen angle by the UI 10; a process (as a step S2) of determining a fundamental cell-representative basic array with a form and a size depending on a resolution of an output device, such as a printer for example, and the ruling frequency and screen angle input by the UI 10; and a process (as a step S3) of determining a reproducible tone number N of the basic array.

The image creating method includes: a process (as a step S4) of determining whether or not the reproducible tone number N of the basic array is $0 \leq N \leq 64$; and a process (as a step S5) of determining whether or not the reproducible tone number N of the basic array is $64 \leq N \leq 128$.

The image creating method has, when the reproducible tone number N of the basic array is $0 \leq N \leq 64$ (Yes at the step S4), a process (as a step S6) of generating a 2×2 dither array having the basic array as its sub-array, with a 4-folded tone number, and distributed thresholds.

The image creating method has, when the reproducible tone number N of the basic array is $64 \leq N \leq 128$ (Yes at the step S5), a process (as a step S7) of generating a 2×2 dither array having the basic array as its sub-array, with a 2-folded tone number, and distributed thresholds.

The image creating method has, when the reproducible tone number N of the basic array exceeds 128 (No at the step S5), a process (as a step S8) of generating a dither array composed of the basic array as it is, with distributed thresholds.

The image creating method will be further detailed below. It is now assumed that all original image data (i.e., a grayscale data of a local region in an original image frame) is an 8-bit data, i.e., 256 tones from "0 (white)" to "255 (black)", and the screen angle is a 0 degree.

The image creating method determines the basic array with a form and a size in accordance with an output resolution, a ruling frequency, and the above-assumed screen angle.

For example, assuming an output resolution of 300 dpi, and a ruling frequency of 100 lpi, besides the screen angle of 0 degree, it so follows that (output resolution/ruling frequency) =(300/100), which provides a basic array with a size of L×L=3×3 pixels (refer to FIGS. 4A and 4B).

If the reproducible tone number N of the basic array is equivalent to or smaller than one mn-th of the tone number P of original image data, i.e., $N \leq (1/mn)P$, then using the basic array as a sub-array, an m×n dither array is generated, where m and n are integers greater than 1, and may be set equal to each other (m=n).

Here, the reproducible tone number N is (output resolution/ruling frequency)$^2$+1=(300/100)$^2$+1=10 tones (i.e. N=10). The tone number P of original image data is 256, so (1/mn) P=(¼)×256=64 form=n=2, meeting the condition of $N \leq (1/mn)P$.

Figures 8A, 8B:
FIG. 8A is a diagram of a dither array of ranks of 36 tones distributed to the whole pixels, in a manner of going rounds of respective basic arrays, in order, starting from a round of center pixels of the basic arrays.
FIG. 8B, a diagram of a dither array of 256-tone parting thresholds distributed to the whole pixels.

Accordingly, as illustrated in FIGS. 8A and 8B, there is generated a 2×2 dither array having the basic array of 3×3 pixels as its sub-array.

For this effect, numbers are assigned to whole pixels of sub-arrays by a prescribed rule, in order between the sub-arrays, staring from prescribed ones of centered pixels (for L as an odd number) or centermost pixels (for L as an even number) of the sub-arrays, and substituted by thresholds corresponding thereto, thereby generating a dither array consisting of (L×m)×(L×n) pixels. The prescribed rule for assigning numbers to pixels may include one or more of methods of arranging numbers in a curl or eddy form, arranging numbers in a pyramid form, arranging numbers in a cone form, etc.

For example, for the dither array in FIG. 8A, numbers (serial numbers) are arranged in a Z form, to go rounds of sub-arrays in a clockwise snaking manner, in order, starting from a round of center pixels of the sub-arrays. For a halftone representation of original image data of 256 tones ("0" to "255"), as illustrated in FIG. 8B, assigned numbers in pixels of the dither array of FIG. 8A are multiplied by 225/(6×6+1) and rounded, which provides a dither array consisting of 6×6 pixels with distributed thresholds.

A string of original grayscale image data can be sequentially dithered by this dither array to provide a string of corresponding halftone image data. Strings of such halftone data will be stored in a memory of the output device, and processed as necessary to edit by cutting, joining, trimming, etc. in accordance with given output conditions.

Relative to a conventional dithering by a single dither array of L×L pixels, the embodiment described allows for: (1) an m×n-folded tone number, and (2) a maintained center-to-center distance between fundamental cells, permitting a refined reproducibility with a suppressed degradation of image contour, edge, etc.

Further, if the reproducible tone number N of the basic array is greater than one mn-th of the tone number P of original image data, but not exceeding one half of P, i.e., $(1/mn) P<N \leq (½)P$ then there is formed a 2×2 dither array having the basic array as its sub-array.

For example, assuming an output resolution of 900 dpi, and a ruling frequency of 112 lpi, besides the screen angle of 0 degree, it so follows that (output resolution/ruling frequency) =(900/112), which provides a basic array with a size of L×L=8×8 pixels (refer to four regions of 64 pixels enclosed by bold lines in FIG. 9A).

Here, the reproducible tone number N is (output resolution/ruling frequency)$^2$+1=(900/112)$^2$+1, which gives 65 tones (i.e. N=65). The tone number P of original image data is 256, so (1/mn) P=(¼)×256=64 form=n=2, meeting the condition of $(1/mn) P<N \leq (½)P$.

Accordingly, there is generated a 2×2 dither array (an entire region of FIG. 9A=16×16 pixels) having a basic array of 8×8 pixels as its sub-array, for example.

For this effect, numbers are assigned to whole pixels of sub-arrays by a prescribed rule, alternately allotting common numbers to diagonally arranged sub-arrays, and common numbers to the remaining two sub-arrays, in order, starting from prescribed ones of centered pixels (for L as an odd number) or centermost pixels (for L as an even number) of the sub-arrays, and substituted by thresholds corresponding thereto, thereby generating a dither array consisting of 2L×2L pixels.

For the dither array in FIG. 9A, numbers are arranged to whole pixels in a vortex form, alternately allotting common numbers to diagonally arranged two sub-arrays, and common numbers (subsequent numbers) to the remaining two sub-arrays, in order, starting from central pixels of the sub-arrays.

In this case, the last number comes up to 128. The dither array has 16×16=256 pixels in total. If those pixels are serially numbered as illustrated in FIG. 9B, the last number reaches 256, exceeding the highest rank ("255") of 256 tones ("0" to "255"). To this point some number(s) in the dither array of FIG. 9A or corresponding threshold(s) may well be recurrent In the present example, distributed numbers in FIG. 9A are employed as they are, as thresholds, to thereby generate a dither array of 16×16 pixels.

A string of original grayscale image data can be sequentially dithered by such a dither array to provide a string of corresponding halftone image data Strings of such halftone data will be stored in a memory of the output device, and processed as necessary to edit by cutting, joining, trimming, etc. in accordance with given output conditions.

Relative to a conventional dithering by a single dither array of L×L pixels, the embodiment described allows for: (1) an m×n-folded tone number, and (2) a maintained center-to-center distance between fundamental cells, permitting a refined reproducibility with a suppressed degradation of image contour, edge, etc.

If the reproducible tone number N of the basic array is greater than one half of the tone number P of original image data, i.e., (½)P<N, then the image creating method has numbers assigned to whole pixels of a single sub-array (i.e. the basic array) by a prescribed rule, in order, starting from a centered pixel (for L as an odd number) or centermost pixel (for L as an even number) of the sub-array, and substituted by thresholds corresponding thereto, thereby generating a dither array consisting of L×L pixels.

A string of original grayscale image data can be sequentially dithered by such a dither array to provide a string of corresponding halftone image data Strings of such halftone data will be stored in a memory of the output device, and processed as necessary to edit by cutting, joining, trimming, etc. in accordance with given output conditions.

For m=n=2, the image creating method compares the reproducible tone number N of basic array with the tone number P of original image data, to select one of different manners of dithering, as follows.

If the reproducible tone number N of a basic array is equal to or smaller than one fourth of the tone number P of original image data, i.e., N≦(¼)P, then using the basic array as a sub-array, a 2×2 dither array is formed, where numbers are assigned to whole pixels of sub-arrays by a prescribed rule, alternately between the sub-arrays, in order, starting from centered or centermost pixels of the sub-arrays, and are substituted by thresholds corresponding thereto, thereby producing a dither pattern (i.e. a distribution pattern of thresholds) composed of 2L×2L pixels.

If the reproducible tone number N of a basic array is greater than one fourth of the tone number P of original image data, but not exceeding one half of P, i.e., (¼)P<N≦(½)P, then using the basic array as a sub-array, a 2×2 dither array is formed, where numbers are assigned to whole pixels of sub-arrays by a prescribed rule, alternately allotting common numbers to diagonally arranges two sub-arrays, and common numbers to the remaining two sub-arrays, in order, starting from centered or centermost pixels of the sub-arrays, and are substituted by thresholds corresponding thereto, thereby producing a dither pattern composed of 2L×2L pixels.

If the reproducible tone number N of a basic array is greater one half of the tone number P of original image data, i.e., (½)P<N, then numbers are assigned to whole pixels of the basic array by a prescribed rule, in order, starting from a centered or centermost pixel of the basic array, and are substituted by thresholds corresponding thereto, thereby producing a dither pattern composed of L×L pixels.

One of thus produced dither patterns is to be employed to dither original image data.

Even a non-skilled user is thereby allowed to obtain a desirable quality result of halftone process, anytime, by simply setting a ruling frequency and a screen angle, and an output resolution, as necessary.

Figure 12:
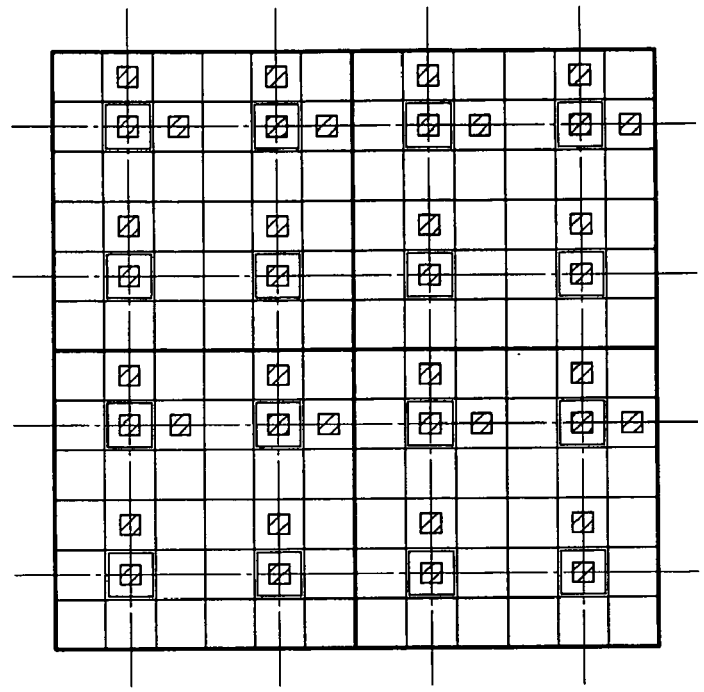
FIG. 12 is an illustration of a result of a halftone process in which the dither array of FIG. 8B was applied to a set of connected gray solid regions of an original image frame having a grayscale value "80".

FIG. 12 is an illustration of a result of a halftone process in which the dither array of FIG. 8B (37 tones, center-to-center distance: 3 pixels) was applied to a set of connected gray solid regions of an original image frame having a grayscale value "80".

Figure 10:
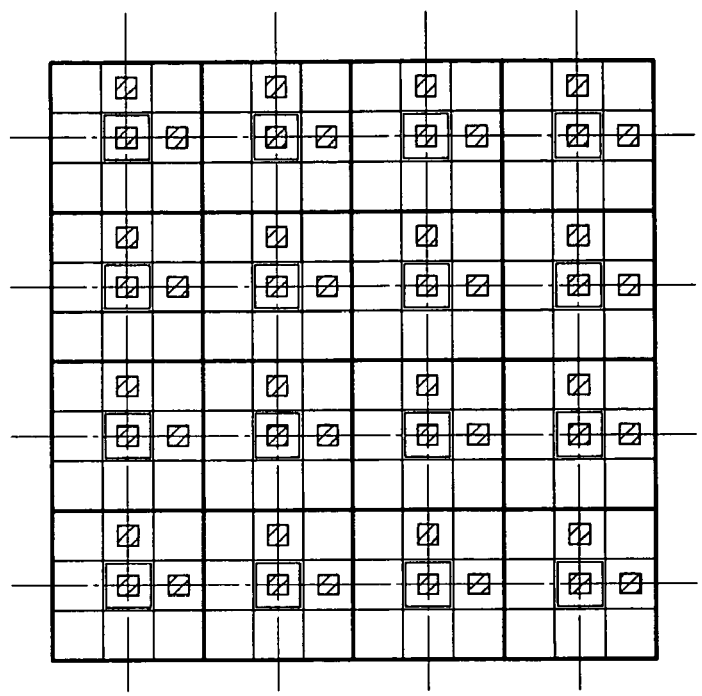
FIG. 10 is an illustration of a result of a halftone process in which the dither array of FIG. 4B was applied to a set of connected gray solid regions of an original image frame having a grayscale value "80".
Figure 11:
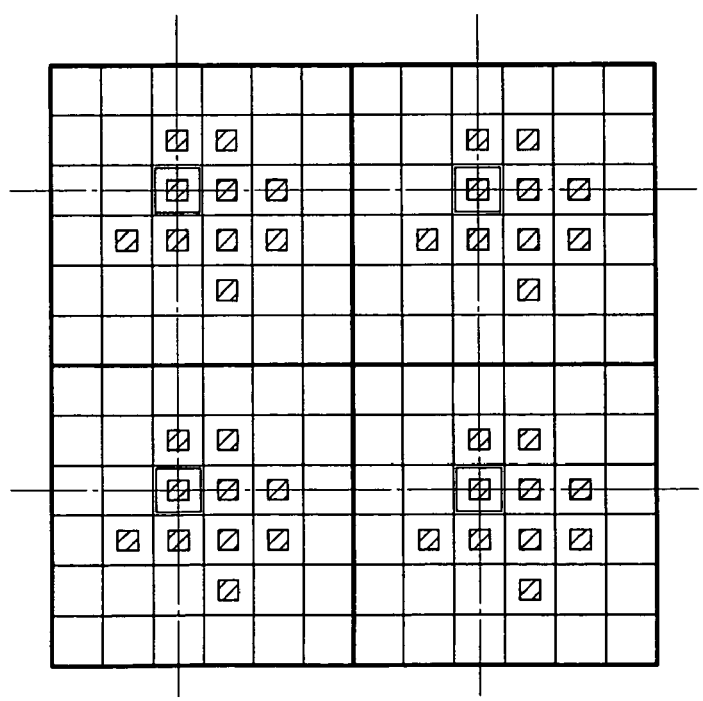
FIG. 11 is an illustration of a result of a halftone process in which the dither array of FIG. 7B was applied to the set of connected gray solid regions of the original image frame having the grayscale value "80".

Illustrated image in FIG. 11 and that in FIG. 12 are identical in total number of black dots (shadowed grid sections). However, in comparison with the image of FIG. 12, the image of FIG. 11 has a half number of dashed lines, i.e., has a doubled center-to-center distance between fundamental cells. On the other hand, the image of FIG. 12 has an identical number of lines to illustrated image in FIG. 10, i.e., and it can be caught that represented fundamental cells have an identical center-to-center distances.

Figures 7A, 7B:
FIG. 7A is a diagram of a dither array of ranks of 36 tones distributed to the whole pixels.
FIG. 7B, a diagram of a dither array of 256-tone parting thresholds distributed to the whole pixels.
Figure 13:
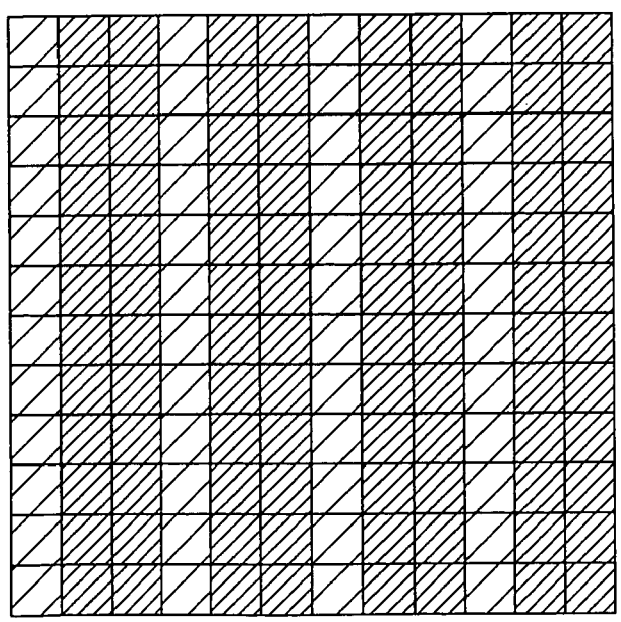
FIG. 13 is an illustration of a set of connected regions of an original image frame in which dark gray stripes with a two-pixel width of a grayscale value "180" and light gray stripes with a one-pixel width of a grayscale value "25" are alternately arranged.
Figure 14:
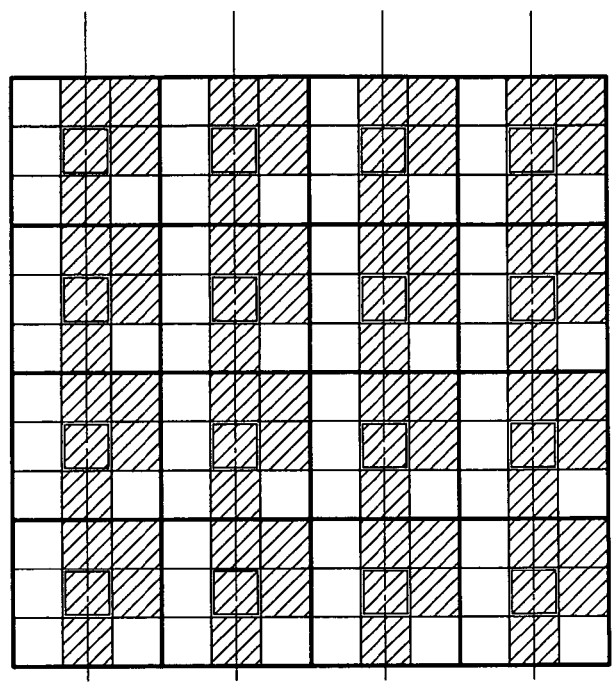
FIG. 14 is an illustration of a result of a halftone process in which the dither array of FIG. 4B was applied to the set of connected regions illustrated in FIG. 13.
Figure 15:
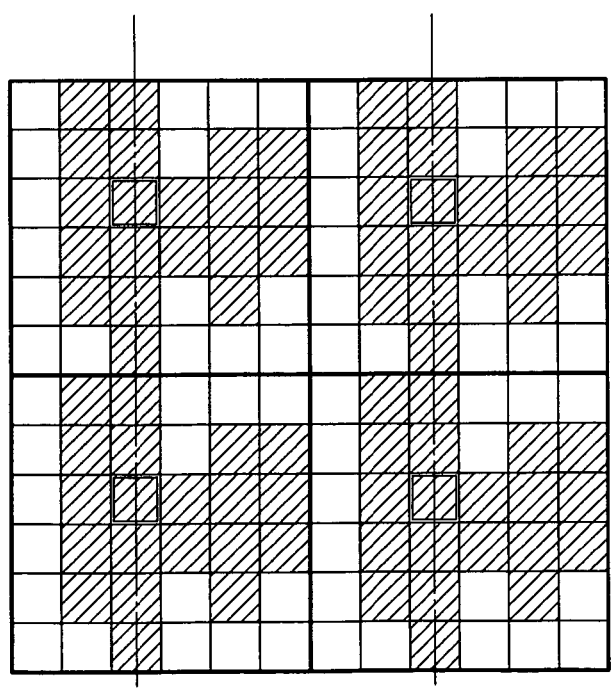
FIG. 15 is an illustration of a result of a halftone process in which the dither array of FIG. 7B was applied to the set of connected regions illustrated in FIG. 13.
Figure 16:
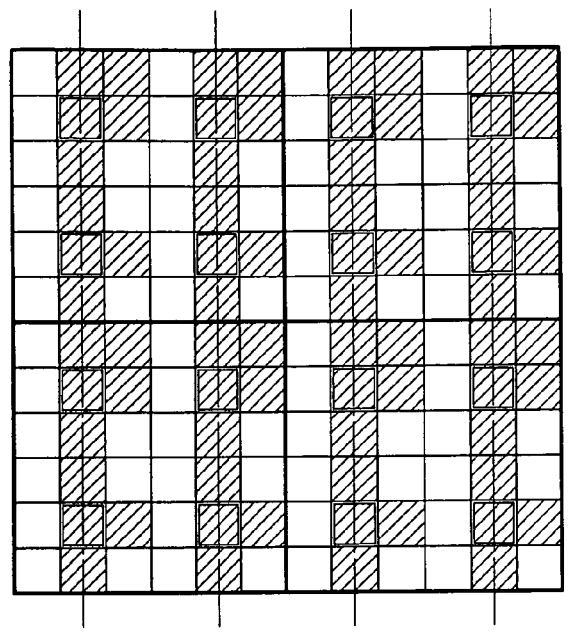
FIG. 16 is an illustration of a result of a halftone process in which the dither array of FIG. 8B was applied to the set of connected regions illustrated in FIG. 13.

FIG. 13 is an illustration of a set of connected regions of an original image frame in which dark gray stripes with a two-pixel width of a grayscale value "180" and light gray stripes with a one-pixel width of a grayscale value "25" are alternately arranged. FIG. 14 is an illustration of a result of a halftone process in which the dither array of FIG. 4B was applied to the set of connected regions illustrated in FIG. 13. FIG. 15 is an illustration of a result of a halftone process in which the dither array of FIG. 7B was applied to the set of connected regions illustrated in FIG. 13. FIG. 16 is an illustration of a result of a halftone process in which the dither array of FIG. 8B was applied to the set of connected regions illustrated in FIG. 13.

It will be seen from FIG. 12 or FIG. 16 that use of dither arrays according to the embodiment, such as in FIG. 8B or FIG. 9A, provides many tones, permitting a refined printing with a favorable reproducibility of image contour, edge, etc.

In the foregoing description, if the reproducible tone number N of a basic array is equivalent to or smaller than one mm-th of the tone number P of original image data, i.e., N≦(1/mn)P, where m and n are integers greater than 1, then there is formed an m×n dither array having the basic array as its sub-array. Instead, this condition may be substituted by such a condition that L≦7, subject to m and n, such that L×L×m×n=256. This is because of L≧8 that has a tone number of 65 or more, which gets over 0-255 tones when four-folded (refer to 9B).

Further, in the foregoing description, if the reproducible tone number N of a basic array is greater than one mm-th of the tone number P of original image data, but not exceeding one half of P i.e., (1/mn)P<N≦(½)P, form and n both 2, then there is formed a 2×2 dither array having the basic array as its sub-array. Instead, this condition may be substituted by such a condition that 8≦L≦11. This is because of L≧12 that has a tone number of 145, which gets over 0-255 tones when doubled.

As will be seen from the foregoing description, according to an aspect of the present embodiment, for creating a halftone image of an original image of a tone number P, where P is a given integer, an image creating method comprises: acquiring an output condition of the halftone image; generating a basic array of pixels meeting the output condition, the basic array consisting of (N−1) pixels, where N is an integer not exceeding a reproducible tone number under the output condition; letting the basic array be a sub-array, setting a super-array of Q sub-arrays, where Q is an integer, such that (N−1)Q≦P; setting a set of (N−1)R thresholds parting P tones, where R is an integer not exceeding Q; distributing the set of (N−1)R thresholds to pixels of R sub-arrays of the super-array, allotting lowest and near-lowest thresholds to central pixels of the R sub-arrays, to generate a dither array of thresholds parting P tones; and dithering a grayscale data of the original image by the dither array.

According to the present embodiment, the above halftone image creating method has lowest and near-lowest thresholds allotted to central pixels of sub-arrays of a dither array, thus allowing for a refined grayscale interval in halftone with a suppressed variation in distance between pixels of minimal thresholds in dither arrays.

Further, according to an aspect of the present embodiment, for creating a halftone image of an original image of a tone number P, where P is a given integer, an image creating system (1) comprises: an output condition acquirer (10) configured to acquire an output condition of the halftone image; a basic array generator (20) configured to generate a basic array of pixels meeting the output condition, the basic array consisting of (N−1) pixels, where N is an integer not exceeding a reproducible tone number under the output condition; a dither array generator (40) configured, letting the basic array be a sub-array, to set a super-array of Q sub-arrays, where Q is an integer, such that $(N-1)Q \leq P$, set a set of (N−1)R thresholds parting P tones, where R is an integer not exceeding Q, and distribute the set of (N−1)R thresholds to pixels of R sub-arrays of the super-array, allotting lowest and near-lowest thresholds to central pixels of the R sub-arrays, to generate a dither array of thresholds parting P tones; and a data processor configured to dither a grayscale data of the original image by the dither array.

According to the present embodiment, the above halftone image creating system has lowest and near-lowest thresholds allotted to central pixels of sub-arrays of a dither array, thus allowing for a refined grayscale interval in halftone with a suppressed variation in distance between pixels of minimal thresholds in dither arrays.

According to the present embodiment, in the above-mentioned image creating method and image creating system, the output condition includes an output resolution, a screen ruling frequency, and a screen angle, the basic array is set as an array of L×L pixels, where L is an integer greater than 1, such that $N-1=L^2$, and the dither array is generated by comparing N with P to determine one of:

(a) R=Q, to have numbers assigned to pixels of the Q sub-arrays by a prescribed rule, in order, starting from centered or centermost pixels of the Q sub-arrays, and substituted by thresholds corresponding thereto; and (b) R<Q, to have numbers assigned to pixels of the Q sub-arrays by a prescribed rule, alternately between the R sub-arrays and Q−R sub-arrays, in order, starting from centered or centermost pixels of the Q sub-arrays, and substituted by thresholds corresponding thereto.

According to the present embodiment, in the above-mentioned image crating method and image creating system, the output condition may include an output resolution, a screen ruling frequency, and a screen angle, the basic array may be set as an array of L×L pixels, where L is an integer greater than 1, such that $N-1=L^2$, and the dither array may be generated by determining:

(a) R=Q=2×2 for N not exceeding one fourth of P, to have numbers assigned to pixels of the Q sub-arrays by a prescribed rule, alternately between sub-arrays, in order, starting from centered or centermost pixels of the Q sub-arrays, and substituted by thresholds corresponding thereto;

(b) R=2 and Q=2×2 for N exceeding one fourth of P but not exceeding one half of P, to have numbers assigned to pixels of the Q sub-arrays by a prescribed rule, alternately with common numbers to the R sub-arrays to be diagonally arranged, and common numbers to Q−R sub-arrays, in order, starting from centered or centermost pixels of the Q sub-arrays, and substituted by thresholds corresponding thereto; and (c) R=Q=1 for N exceeding one half of P, to have numbers assigned to pixels of a Q sub-array by a prescribed rule, in order, starting from a centered or centermost pixel of the Q sub-array, and substituted by thresholds corresponding thereto.

As parts of an embodiment for a screen angle of 45 degrees, explanatory examples are illustrated in FIG. 17 to FIG. 22.

Figure 17:
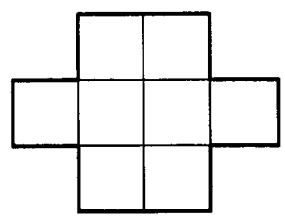
FIG. 17 is a diagram of an exemplary basic array of (2×4=) 8 pixels for a screen angle of 45 degree.

FIG. 17 illustrates a basic array (9 tones) for a sample (as an example of a four-folded tone number) of a ruling frequency of 106 lpi.

Figure 18:
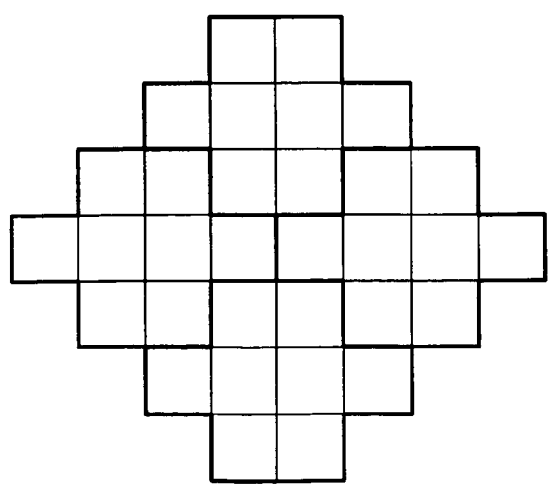
FIG. 18 is a diagram of a 2×2 array having the basic array of 8 pixels of FIG. 17 as its sub-array.

FIG. 18 is a diagram of a 2×2 array (33 tones) having the basic array of 8 pixels of FIG. 17 as its sub-array.

Figure 19A:
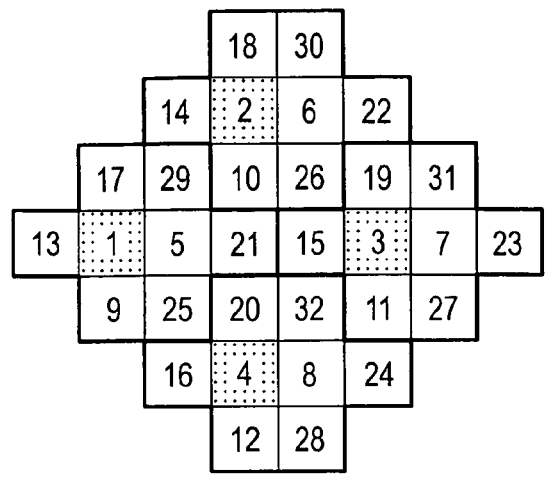
FIG. 19A is a diagram of a dither array of ranks of 32 tones distributed to the whole pixels, in a manner of going clockwise rounds of respective basic arrays, in order, starting from a round of prescribed ones of central pixels of the basic arrays.

FIG. 19A is a diagram of a dither array using the array of FIG. 18, where ranks of 32 tones are distributed to whole pixels, alternately between sub-arrays, in order, starting from prescribed ones of centermost pixels of the sub-arrays.

Figure 19B:
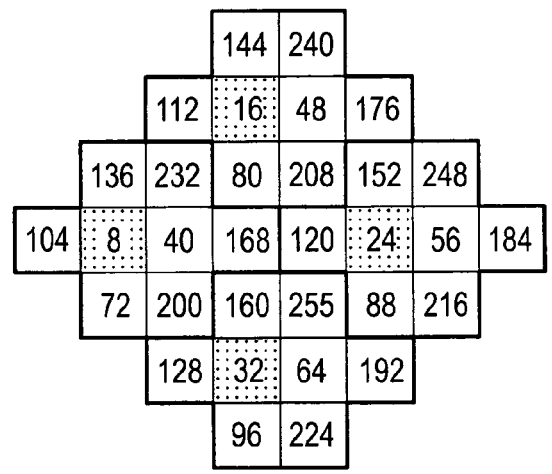
FIG. 19B, a diagram of a dither array of 256-tone parting thresholds distributed to the whole pixels.

FIG. 19B is a diagram of the dither array of FIG. 19A, as ranks of pixels are substituted by 256-tone parting thresholds.

Figure 20:
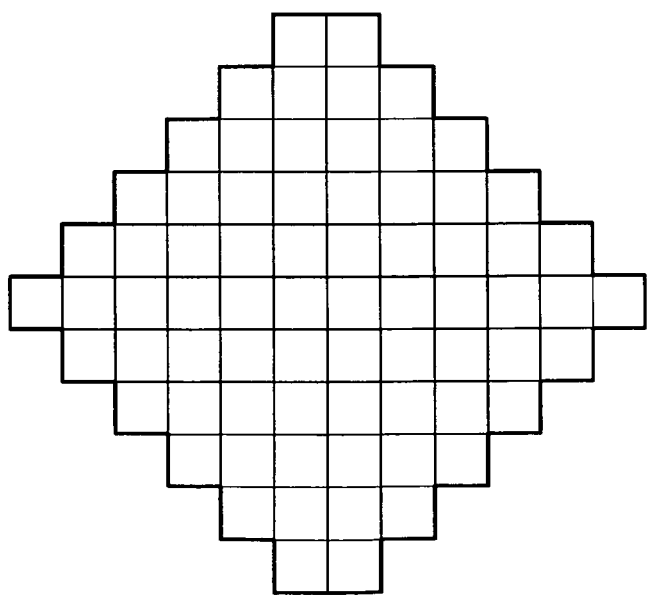
FIG. 20 is a diagram of an exemplary basic array of (6×12=) 72 pixels for the screen angle of 45 degree.

FIG. 20 is a diagram of a basic array (73 tones) for a sample (as an example of a double tone number) of a ruling frequency of 37 lpi.

Figure 21:
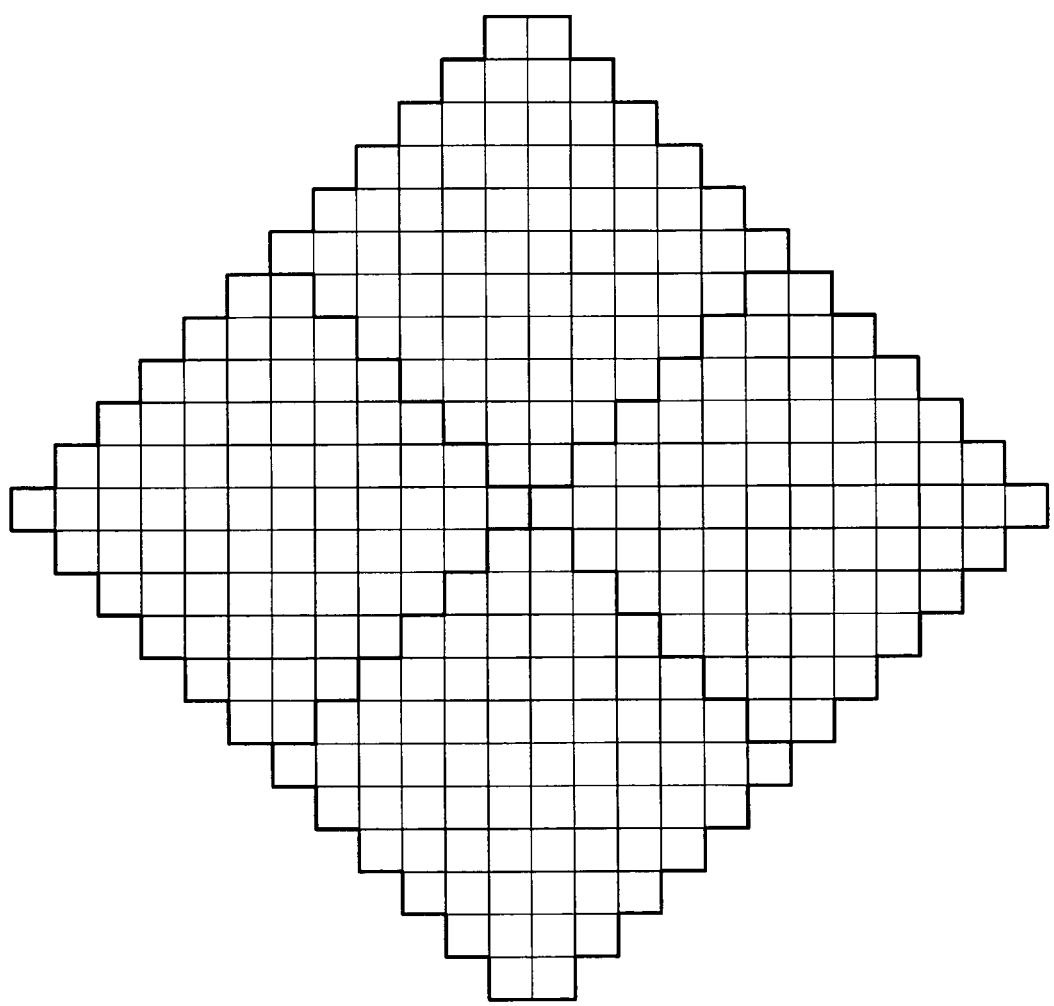
FIG. 21 is a diagram of a 2×2 array having the basic array of 72 pixels of FIG. 20 as its sub-array.

FIG. 21 is a diagram of a 2×2 array having the basic array of FIG. 20 as its sub-array.

Figure 22A:
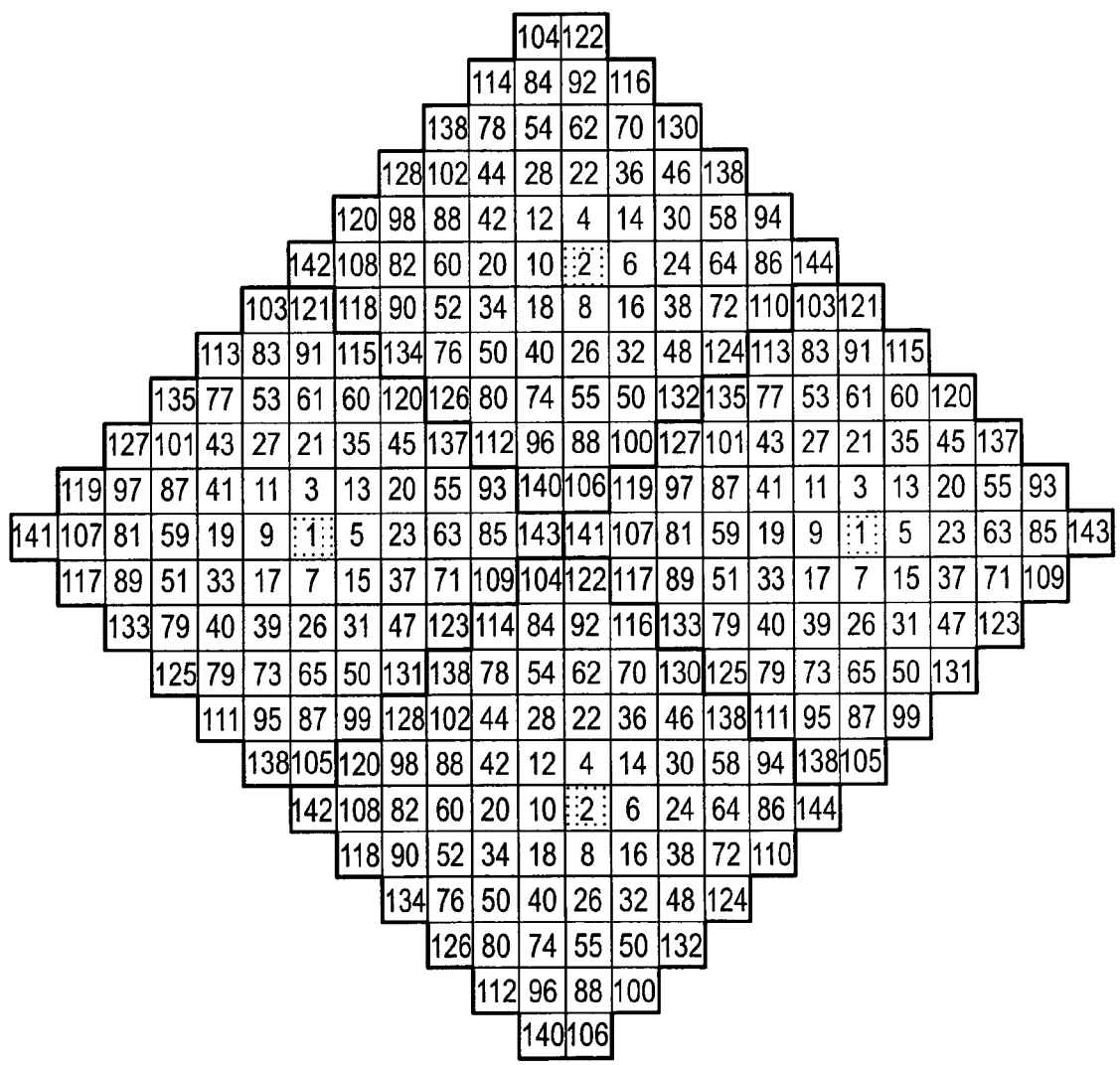
FIG. 22A is a diagram of a dither array of ranks of 144 tones recurrently distributed to the whole pixels, in a manner of going rounds of respective basic arrays, allotting common ranks to pixels of diagonally arranged two basic arrays, and common subsequent ranks to pixels of the remaining two basic arrays, in order, starting from a round of prescribed ones of central pixels of the basic arrays.

FIG. 22A is a diagram of a dither array using the array of FIG. 21, where ranks are distributed to whole pixels, alternately allotting common ranks to horizontally diagonal sub-arrays, and common ranks to vertically diagonal sub-arrays, in order, starting from prescribed ones of centermost pixels of the sub-arrays, as an example of setting for a maximal threshold to be a double (144) of a section number (72) of the basic array.

Figure 22B:
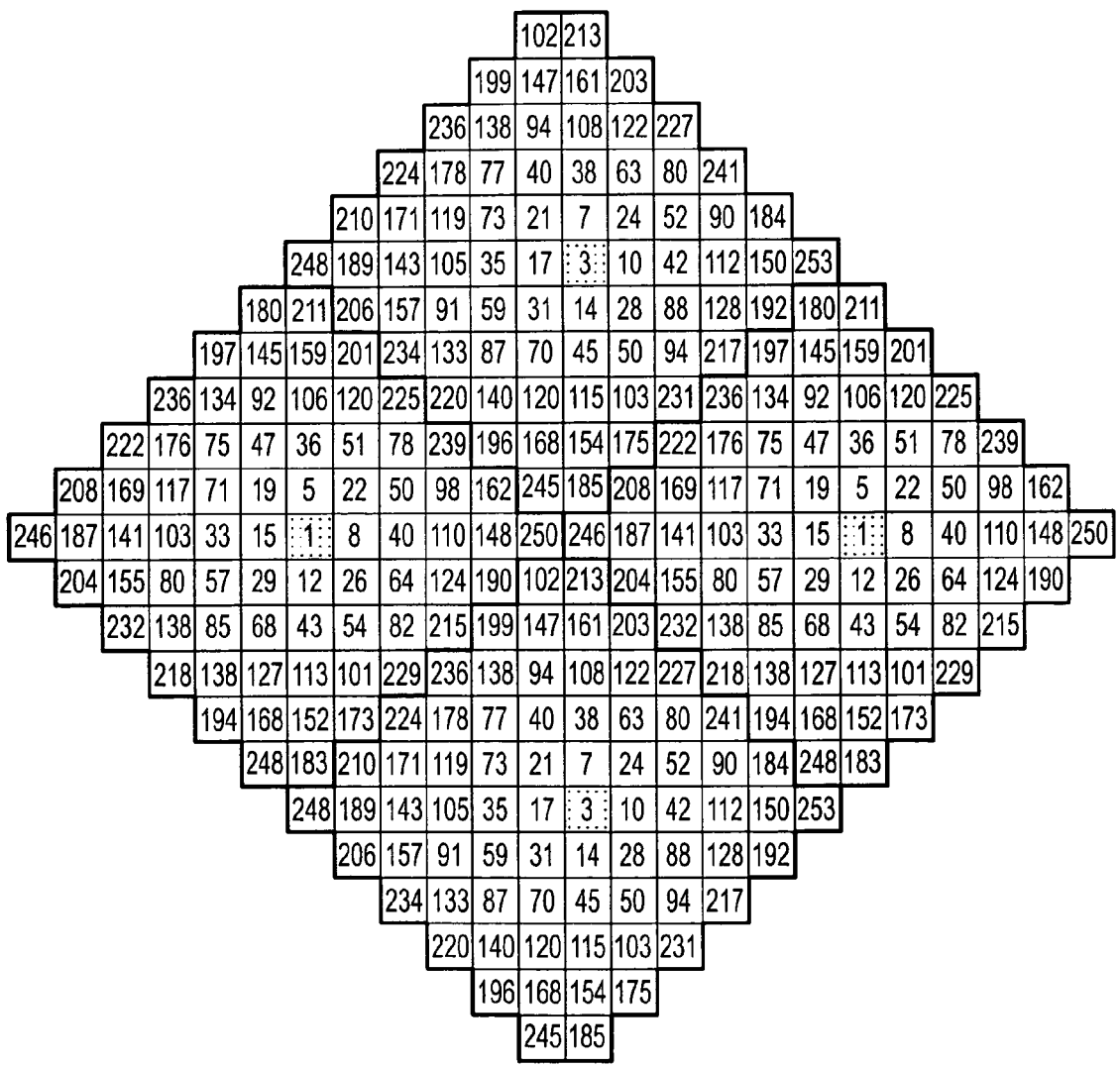
FIG. 22B, a diagram of a dither array in which a tone rank of a respective pixel of the dither array illustrated in FIG. 22A is substituted by a 256-tone parting threshold commensurate therewith.

FIG. 22B is a diagram of the dither array of FIG. 22A, as ranks of pixels are substituted by 256-tone parting thresholds.

Except for geometric arrangement for the screen angle 45 degrees, the examples illustrated in FIG. 17 to FIG. 22 have like configurations to those arranged for screen 0 degree.

This application is based upon the Japanese Patent Application No. 2007-202942, filed on Aug. 3, 2007, the entire content of which are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. An image creating method for creating a halftone image of an original image of a tone number P, where P is a given integer, the image creating method comprising the steps of:
acquiring an output condition of the halftone image;
generating a basic array of pixels meeting the output condition, the basic array consisting of (N−1) pixels, where N is an integer not exceeding a reproducible tone number under the output condition;
letting the basic array be a sub-array, setting a super-array of Q sub-arrays, where Q is an integer, such that $(N-1)Q \leq P$;
setting a set of (N−1)R thresholds parting P tones, where R is an integer not exceeding Q;
distributing the set of (N−1)R thresholds to pixels of R sub-arrays of the super-array, allotting lowest and near-lowest thresholds to central pixels of the R sub-arrays, to generate a dither array of thresholds parting P tones; and
dithering a grayscale data of the original image by the dither array.

2. The image creating method according to claim 1, wherein the output condition includes an output resolution, a screen ruling frequency, and a screen angle, the basic array is set as an array of L×L pixels, where L is an integer greater than 1, such that $N-1=L^2$, and the dither array is generated by comparing N with P to determine one of:
   (a) R=Q, to have numbers assigned to pixels of the Q sub-arrays by a prescribed rule, in order, starting from centered or centermost pixels of the Q sub-arrays, and substituted by thresholds corresponding thereto; and
   (b) R<Q, to have numbers assigned to pixels of the Q sub-arrays by a prescribed rule, alternately between the R sub-arrays and Q−R sub-arrays, in order, starting from centered or centermost pixels of the Q sub-arrays, and substituted by thresholds corresponding thereto.

3. The image creating method according to claim 2, wherein R=Q=mn for N not exceeding one mn-th of P, where m and n are integers greater than 1, to set the super-array as an m×n array of the sub-array, as an (L×m)×(L×n) array of pixels.

4. The image creating method according to claim 2, wherein m=n.

5. The image creating method according to claim 2, wherein R=2 and Q=2×2 for N exceeding one mn-th of P but not exceeding one half of P, where m and n are integers greater than 1, to set the super-array as a 2×2 array of the sub-array, as a 2L×2L array of pixels.

6. The image creating method according to claim 2, wherein R=Q=1 for N exceeding one half of P, and the super-array comprises an L×L array of pixels.

7. The image creating method according to claim 1, further comprising the steps of:
   setting a set of (N−1)(Q−R) thresholds parting P tones; and
   distributing the set of (N−1)(Q−R) thresholds to pixels of (Q−R) sub-arrays of the super-array, allotting lowest and near-lowest thresholds to central pixels of the (Q−R) sub-arrays.

8. The image creating method according to claim 1, wherein the output condition includes an output resolution, a screen ruling frequency, and a screen angle, the basic array is set as an array of L×L pixels, where L is an integer greater than 1, such that $N-1=L^2$, and the dither array is generated by determining:
   (a) R=Q=2×2 for N not exceeding one fourth of P, to have numbers assigned to pixels of the Q sub-arrays by a prescribed rule, alternately between sub-arrays, in order, starting from centered or centermost pixels of the Q sub-arrays, and substituted by thresholds corresponding thereto;
   (b) R=2 and Q=2×2 for N exceeding one fourth of P but not exceeding one half of P, to have numbers assigned to pixels of the Q sub-arrays by a prescribed rule, alternately allotting common numbers to the R sub-arrays to be diagonally arranged, and common numbers to Q−R sub-arrays, in order, starting from centered or centermost pixels of the Q sub-arrays, and substituted by thresholds corresponding thereto; and
   (c) R=Q=1 for N exceeding one half of P, to have numbers assigned to pixels of a Q sub-array by a prescribed rule, in order, starting from a centered or centermost pixel of the Q sub-array, and substituted by thresholds corresponding thereto.

9. An image creating system for creating a halftone image of an original image of a tone number P, where P is a given integer, the image creating system comprising:
   an output condition acquirer configured to acquire an output condition of the halftone image;
   a basic array generator configured to generate a basic array of pixels meeting the output condition, the basic array consisting of (N−1) pixels, where N is an integer not exceeding a reproducible tone number under the output condition;
   a dither array generator configured, letting the basic array be a sub-array, to set a super-array of Q sub-arrays, where Q is an integer, such that (N−1)Q≦P, set a set of (N−1)R thresholds parting P tones, where R is an integer not exceeding Q, and distribute the set of (N−1)R thresholds to pixels of R sub-arrays of the super-array, allotting lowest and near-lowest thresholds to central pixels of the R sub-arrays, to generate a dither array of thresholds parting P tones; and
   a data processor configured to dither a grayscale data of the original image by the dither array.

10. The image creating system according to claim 9, wherein the output condition includes an output resolution, a screen ruling frequency, and a screen angle, the basic array is set to be an array of L×L pixels, where L is an integer greater than 1, such that $N-1=L^2$, and the dither array generator compares N with P to determine one of:
    (a) R=Q, to have numbers assigned to pixels of the Q sub-arrays by a prescribed rule, in order, starting from centered or centermost pixels of the Q sub-arrays, and substituted by thresholds corresponding thereto; and
    (b) R<Q, to have numbers assigned to pixels of the Q sub-arrays by a prescribed rule, alternately between the R sub-arrays and Q−R sub-arrays, in order, starting from centered or centermost pixels of the Q sub-arrays, and substituted by thresholds corresponding thereto.

11. The image creating system according to claim 10, wherein R=Q=mn for N not exceeding one mn-th of P, where m and n are integers greater than 1, to set the super-array as an m×n array of the sub-array, as an (L×m)×(L×n) array of pixels.

12. The image creating system according to claim 10, wherein R=2 and Q=2×2 for N exceeding one mn-th of P but not exceeding one half of P, where m and n are integers greater than 1, to set the super-array as a 2×2 array of the sub-array, as a 2L×2L array of pixels.

13. The image creating system according to claim 10, wherein R=Q=1 for N exceeding one half of P, and the super-array comprises an L×L array of pixels.

14. The image creating system according to claim 9, wherein the dither array generator sets a set of (N−1)(Q−R) thresholds parting P tones, and distributes the set of (N−1)(Q−R) thresholds to pixels of (Q−R) sub-arrays of the super-array, allotting lowest and near-lowest thresholds to central pixels of the (Q−R) sub-arrays.

15. The image creating system according to claim 9, wherein the output condition includes an output resolution, a screen ruling frequency, and a screen angle, the basic array is set as an array of L×L pixels, where L is an integer greater than 1, such that $N-1=L^2$, and the dither array generator determines one of:
    (a) R=Q=2×2 for N not exceeding one fourth of P, to have numbers assigned to pixels of the Q sub-arrays by a prescribed rule, alternately between sub-arrays, in order, starting from centered or centermost pixels of the Q sub-arrays, and substituted by thresholds corresponding thereto;
    (b) R=2 and Q=2×2 for N exceeding one fourth of P but not exceeding one half of P, to have numbers assigned to pixels of the Q sub-arrays by a prescribed rule, alternately allotting common numbers to the R sub-arrays to be diagonally arranged, and common numbers to Q−R sub-arrays, in order, starting from centered or centermost pixels of the Q sub-arrays, and substituted by thresholds corresponding thereto; and (c) R=Q=1 for N exceeding one half of P, to have numbers assigned to pixels of a Q sub-array by a prescribed rule, in order, starting from a centered or centermost pixel of the Q sub-array, and substituted by thresholds corresponding thereto.

\* \* \* \* \*